United States Patent [19]

Bocci et al.

[11] Patent Number: 5,148,482
[45] Date of Patent: Sep. 15, 1992

[54] LAYERED SESSION DATA UNIT FRAME

[75] Inventors: Paul M. Bocci, Roselle; Alan L. Wilson, Hoffman Estates; Walter F. Anderson, Chicago, all of Ill.

[73] Assignee: Motorola, Inc., Schaumburg, Ill.

[21] Appl. No.: 707,475

[22] Filed: May 30, 1991

[51] Int. Cl.$^5$ .............................................. H04K 1/00
[52] U.S. Cl. .......................................... 380/48; 380/49
[58] Field of Search ................................. 380/25, 47–49

[56] References Cited

U.S. PATENT DOCUMENTS 4,941,176 7/1990 Matyas et al. ........................ 380/25

Primary Examiner—Salvatore Cangialosi
Attorney, Agent, or Firm—Wayne J. Egan

[57] ABSTRACT

A layered session data unit frame (300) is provided wherein a first frame (200), designated a session data unit("SDU"), containing user information (209), a link control field (205) and an encryption field (207), is divided into a plurality of smaller frames (321, 323), each having an information field and designated a link data unit("LDU"). According to the invention, the SDU user information (209) is allocated into the information fields (211, 213) of the plurality of LDU's. The SDU link control field (205) is divided into a plurality of sub-fields and imbedded into the information fields of a first group of LDU's. The SDU encryption field (207) is divided into a plurality of sub-fields and imbedded into the information fields of a second group of LDU's. The sub-fields may be distributed throughout the LDU's in a generally uniform fashion. For instance, where the user information comprises coded voice words, the sub-fields may be separated by 30 msec words such that voice may be produced during the transmission of the field without any audio delay.

24 Claims, 1 Drawing Sheet

LAYERED SESSION DATA UNIT FRAME

TECHNICAL FIELD

This application relates to data frame structures.

BACKGROUND OF THE INVENTION

The success of any digitally-based radio frequency ("RF") communications system is dependent upon the structures that are used to create, store, transfer, and modify data used within that system. This is particularly true when the user data may be encrypted. As is known, there are several difficulties with such structures, or frames. First, in order to guarantee that the RF communications link is established and maintained it is important to include as much addressing and control for the RF repeater as possible. Second, an encrypted message requires a separate synchronization data field to allow listeners to re-synchronize their encryption algorithms as often as possible without using excessive channel capacity.

A typical RF system (100) is shown in FIG. 1. There is shown a repeater (10), a first mobile unit (11), and a second mobile unit (12). As shown, the first mobile unit transmits inbound frames to the repeater via an inbound channel (16), and the repeater transmits outbound frames to the second mobile unit via an outbound channel (17). In FIG. 1, it is assumed that the first mobile transmits the inbound frame (18) to the repeater which, after processing, transmits it as the outbound frame (19) to the second mobile.

Referring now at the inbound frame (18), the frame consists of a signalling mark (20), a network access code (22), an inbound link control field (13), an encryption synchronization field (24), and an encrypted voice field (26). Likewise, the outbound frame (19) consists of a signalling mark (21), a network access code (23), an outbound link control field (14), an encryption synchronization field (25), and an encrypted voice field (27).

As is known in the art, the repeater will normally repeat the link control field. In this case, the inbound link control field (13) will be identical to the outbound link control field (14). Optionally, however, the repeater may delete or delay the inbound link control field (13) to insert a priority outbound link control field (14). In this case, the inbound and outbound link control fields will be different. As is known, the repeater never alters the encryption synchronization field.

Note that, since there are two links, an inbound and an outbound, the inbound link control field (13) and the outbound link control field (14) are not necessarily the same.

A typical frame (200), as in the prior art, that may be used in FIG. 1 is shown in FIG. 2. There is shown a frame (200), whose total bit length (261) may be, for instance, 3344 bits. The total frame (200) comprises an encrypted voice and application data (209) of 2704 bits, a 48 bit synchronization mark (101), a 64 bit network access code (103), a link control field (205) comprising 240 bits, and an encryption synchronization field (207) of 288 bits. Hereinafter, the encryption synchronization field (207) is alternately referred to as "esync".

As is known, in order to efficiently provide RF link signalling requires that short address fields be inserted as frequently as possible to allow the RF link to be controlled. This includes endpoint addressing, link establishment, and link disconnect. To efficiently provide crypto sync, comparatively large synchronization fields must be inserted into the data stream in an efficient manner.

A key problem faced by an RF communication system using a prior art frame (200) is to provide synchronization capability for the encryption so that the receivers can synchronize their decryption in the middle of the message. This occurs for radios that are scanning as well as radios that experience a fade at the beginning of the message.

Cryptographic synchronization requires at least 64 bits and up to 94 bits of information depending on the cryptographic system being employed. Performance at error rates up to 10% are desirable. If a rate ¼ code is used to provide error correction then at least 188 bits of embedded signalling are necessary for synchronization and the signalling is likely to work only up to 5% bit error rate (hereinafter "BER"). The provision of 188 bits of signalling is sufficient to require a large frame structure made up of several frames of VSELP voice data, each VSELP data frame occupying at least 144 bits. For existing radio systems, the esync field (207) provides 288 bits in order to pass at least 94 bits of information.

Those readers who desire further information on VSELP are directed to the following U.S. patents: "Digital Speech Coder Having Improved Vector Excitation Source", Ira A. Gerson, U.S. Pat. No. 4,817,157, issued Mar. 28, 1989, and "Digital Speech Coder Having Improved Vector Excitation Source", Ira A. Gerson, U.S. Pat. No. 4,896,361, issued Jan. 23, 1990. Both patents are assigned to Motorola, Inc.

The foregoing U.S. patents are hereby incorporated by reference.

It is possible to reduce the channel capacity burden for esync by inserting the esync message every 10 to 20 voice frames. In this way, the channel capacity required for esync can be reduced to a fraction of the capacity allocated to voice. This has the effect of spreading out the esync over a time interval ranging from ⅓ second (333 milliseconds) to more than 1 second.

Current systems provide an esync for every 12 voice frames, each frame encoding 30 millisecond of speech. This provides a re-sync every 360 millisecond. If the data link control (205) and addressing information (103) were distributed over the same intervals, then very substantial delays for data link signals would be incurred to the detriment of a total system with many other services besides encrypted voice.

Therefore, it is desirable to provide an improved frame structure.

SUMMARY OF THE INVENTION

Accordingly, a layered session data unit frame is provided. The invention may be understood with reference to the prior art frame structure (200) depicted in FIG. 2 as comprising a session data unit, and FIG. 3, which depicts a first embodiment (300) of the invention, as comprising two (2) link data units. Hereinafter, a session data unit will be referred to as "SDU" and a link data unit will be referred to as "LDU".

Briefly, according to the invention, the SDU user information (209) comprising encrypted voice and application data is divided into two portions (211, 213). These portions (211, 213) are arranged to form a first LDU (321) and a second LDU (323), the first LDU (321) having its own synchronization mark (101) and network access code (103), and the second LDU (323)

having its own synchronization mark (201) and network access code (203). The link control field (205) is then divided into a plurality of sub-fields and imbedded into the first LDU encrypted voice/data information field (211), the individual sub-fields distributed through the length of the field (211) in a generally uniform fashion. For instance, the fields may be separated by 30 msec VSELP words such that voice may be produced during the transmission of the field without any audio delay. In like manner, the encryption field (207) is also divided into a plurality of sub-fields and imbedded into the second LDU information field (213), the individual sub-fields distributed uniformly throughout the body of the second frame information field (213).

DETAILED DESCRIPTION OF THE INVENTION

Figure 3:
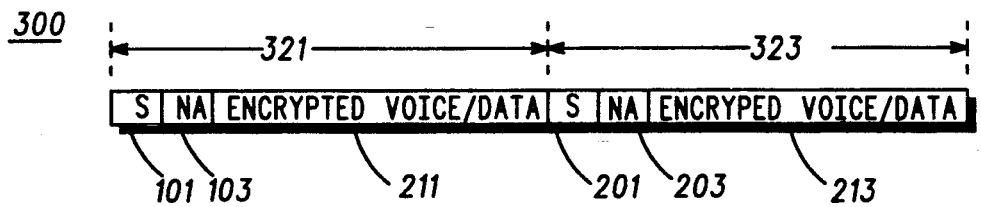
FIG. 3 shows a first embodiment of a layered session data unit frame, in accordance with the present invention.

Referring now to FIG. 3, it will be appreciated that one aspect of this structure (300) is that data is split into two (2) layers of organization, a session layer and a data link layer. In the session layer the data is arranged in a session data unit (hereinafter "SDU") which is designed for the convenience of higher layer functions such as VSELP and encryption. In the data link layer the data is arranged into link data units (hereinafter "LDU") for the convenience of lower level functions, primarily those found in RF repeaters and base stations.

Figure 1:
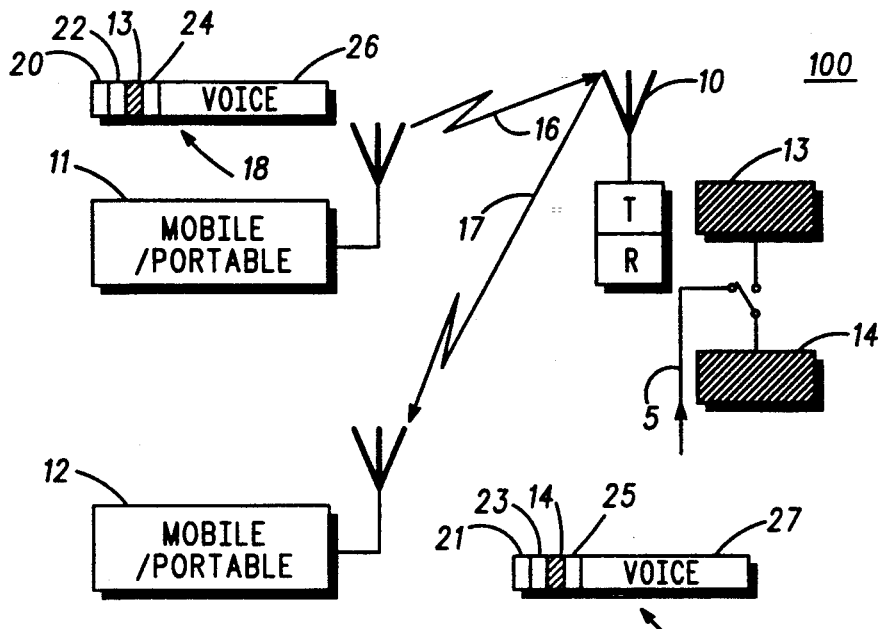
FIG. 1 shows an RF communication system.
Figure 2:
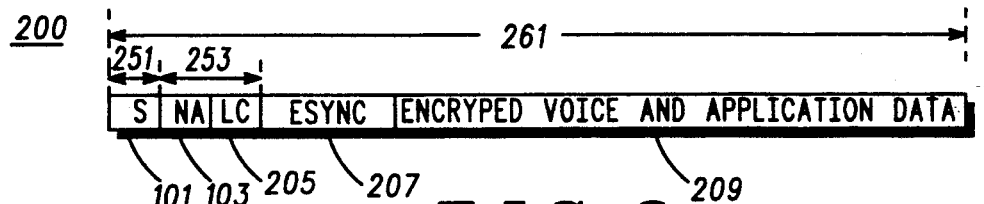
FIG. 2 shows a data frame, as in the prior art.

Using the SDU-LDU nomenclature, it may be said that the structure (300) of FIG. 3 comprises two (2) LDU's, with the corresponding SDU comprising the link control (205), the esync (207), and the encrypted voice and application data (209), as shown in FIG. 2. It thus will be appreciated that a SDU (such as that of FIG. 2) can be split and transported into 2 or more LDU's (such as that of FIG. 3), with one-half of each SDU being transported into each LDU.

Although FIG. 2 and FIG. 3 depict the LDU's being of equal size, that is, containing an equal number of bits, symbols, or words, it will be appreciated that the SDU of FIG. 2 may be divided into LDU's of different or non-equal size. With such an arrangement, the first LDU would contain a different number of bits, symbols, or words than the second LDU. It will further be appreciated that the SDU of FIG. 2 may be divided into a number of component LDU's other than two. For instance, the SDU of FIG. 2 might be divided into three (3) or more LDU's. In another instance, the SDU of FIG. 2 might be divided into twelve (12) LDU's.

Thus, assuming the encrypted information field or area (209) of the frame (200) of FIG. 2 contains 2608 bits, then a first portion of these, or 1328 bits, appear in the first information field or area (211) of the frame (300) of FIG. 3, with the remainder, or 1280 bits, appearing in the second information field or area (213) of the frame (300) of FIG. 3. Further, assuming the link control field (205) of the frame (200) of FIG. 2 includes 240 bits, these being distributed throughout the first information area (211) of the frame (300) of FIG. 3, then the total size of the first information area (211) of FIG. 3 is 1328+240=1568 bits. Likewise, assuming the esync field (207) of the frame (200) of FIG. 2 includes 288 bits, these being distributed throughout the second information field area (213) of the frame (300) of FIG. 3, then the total length of the second information area (213) is 1280+288=1568 bits.

Conventional technology in use today attempts to compromise between the requirements of crypto sync and other embedded signals such as repeater addressing. Typically, all signals are periodically inserted into the channel at the same basic rate into the same basic data structure. By layering the data structure into 2 layers, it is possible to separate the requirements of the upper and lower layers and optimize their signalling independently. In terms of frame structure, this may be viewed as sub-dividing the larger data frames used for crypto sync into smaller frames for optimizing data link layer functions.

Figure 4:
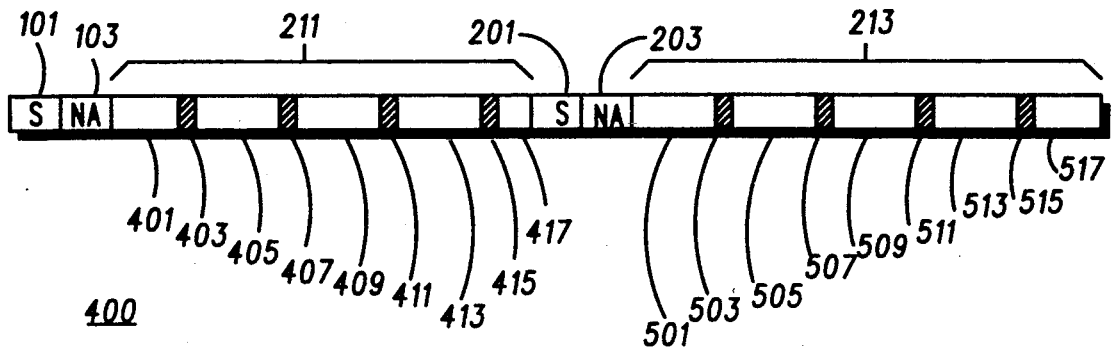
FIG. 4 is a further view of the first embodiment.

FIG. 4 shows an exploded view of FIG. 3, showing the first LDU or area (211) and the second LDU or area (213) of the frame (300) of FIG. 3. Note that each frame area (211, 213) includes its own sync (101, 201) and network access code field (103, 203). Further note that the link control field (205) comprising 240 bits are broken down into four (4) sub-fields (403, 407, 411, and 415) respectively containing 72 bits, 72 bits, 72 bits, and 24 bits. As shown, the link control sub-fields (403, 407, 411 and 415) are uniformly distributed throughout the first frame area (211). Also note that the esync field (207) comprising 288 bits are broken down into four (4) sub-fields (503, 507, 511, and 515 containing 72 bits each. As shown, the esync sub-fields (503, 507, 511 and 515) are uniformly distributed throughout the second frame area or LDU (213).

For applications where encryption is not required, the esync field (207) will not be used. As a result, the second frame area or LDU (213) may contain a second link control field. In this case, the sub-fields (503, 507, 511 and 515) will contain link control information instead of esync information.

Thus, a first frame or SDU, containing user information, a link control field and an encryption field, is divided into a plurality of smaller frames or LDU's, each having an information field and designated a link data unit. The SDU user information is allocated into the information fields of the plurality of LDU's. The SDU link control field is divided into a plurality of sub-fields and imbedded into the information fields of a first group of LDU's. The SDU encryption field is divided into a plurality of sub-fields and imbedded into the information fields of a second group of LDU's. The sub-fields may be uniformly distributed throughout the LDU's. For a voice coding example, the sub-fields may be separated by 30 msec words such that voice may be produced during the transmission of the field without any audio delay.

What is claimed is:

1. In an RF communication unit arranged to communicate with a base radio station by transmitting signals over an RF channel 16, the signals arranged to form one or more frames, and where the RF communication unit comprises information to be transmitted, the information comprising a link control field, an encryption field and a user field, wherein the user information is encrypted, a method of forming a frame comprising the following steps:

(a) dividing the user field into a first area and a second area;

(b) imbedding the link control field for the purpose of addressing in the first area; and (c) imbedding the encryption field in the second area.

2. The method of claim 1 further comprising the steps of:

(c1) dividing the encryption field into several sub-fields; and, (c2) distributing these sub-fields throughout the second area.

3. The method of claim 2 further comprising the step of distributing the encryption sub-fields throughout the second area in a generally uniform fashion.

4. The method of claim 3 further comprising the step of dividing the encryption field into four (4) sub-fields.

5. The method of claim 4 wherein each encryption sub-field contains 72 bits.

6. The method of claim 3 wherein the second area contains a synchronization field and a network access code field.

7. The method of claim 1 further comprising the steps of:

(b1) dividing the link control field into several sub-fields; and, (b2) distributing these sub-fields throughout the first area.

8. The method of claim 7 further comprising the step of distributing the link control sub-fields throughout the first area in a generally uniform fashion.

9. The method of claim 8 further comprising the step of dividing the link control field into four (4) sub-fields.

10. The method of claim 9 wherein the first three (3) sub-fields contains 72 bits each, and the fourth sub-field contains 24 bits.

11. The method of claim 8 wherein the first area contains a synchronization field and a network access code field.

12. The method of claim 1 wherein the first and second areas are of unequal size, that is, the number of bits or symbols contained in the first area is not equal to the number of bits or symbols contained in the second area.

13. The method of claim 12 further comprising the steps of:

(c1) dividing the encryption field into several sub-fields; and, (c2) distributing these sub-fields throughout the second area.

14. The method of claim 13 further comprising the step of distributing the encryption sub-fields throughout the second area in a generally uniform fashion.

15. The method of claim 14 wherein the second area contains a synchronization field and a network access code field.

16. The method of claim 12 further comprising the steps of:

(b1) dividing the link control field into several sub-fields; and, (b2) distributing these sub-fields throughout the first area.

17. The method of claim 16 further comprising the step of distributing the link control sub-fields throughout the first area in a generally uniform fashion.

18. The method of claim 17 wherein the first area contains a synchronization field and a network access code field.

19. An RF communication unit arranged to communicate with a base radio station by transmitting signals over an RF channel 16, the signals arranged to form one or more frames, and where the RF communication unit comprises information to be transmitted, the information comprising a link control field, an encryption field and a user field, wherein the user information is encrypted, the RF communications unit arranged for forming a frame, the frame comprising:

a plurality of data units, each containing information fields containing user information;

a first group of said plurality of data units including link control information for the purpose of addressing arranged in sub-fields that are imbedded in the information fields of the member data units; and a second group of said plurality of data units including encryption information arranged in sub-fields that are imbedded in the information fields of the member data units.

20. The RF communication unit of claim 19 wherein the sub-fields are distributed throughout the information fields in a generally uniform fashion.

21. The RF communication unit of claim 20 wherein the user information comprises coded voice words, and the sub-fields are separated by 30 msec voice words such that voice may be produced during the transmission of the field without any audio delay.

22. The RF communication unit of claim 21 where the words are encoded by the VSELP algorithm.

23. The RF communication unit of claim 22 where the data units are of generally equal size, that is, the contain substantially the same number of bits, symbols, or words.

24. The RF communication unit of claim 23 where the plurality of data units is twelve (12).

* * * * *